(12) United States Patent
Haecker et al.

(10) Patent No.: US 10,641,326 B2
(45) Date of Patent: May 5, 2020

(54) PLAIN BEARING BUSH

(71) Applicant: KS Gleitlager GmbH, St. Leon-Rot (DE)

(72) Inventors: Stefan Haecker, Ubstadt-Weiher (DE);
Wolfgang Baur, Ubstadt-Weiher (DE);
Andreas Klein, St. Leon-Rot (DE);
Martin Gorff, Zweiflingen (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 16/309,287

(22) PCT Filed: Jun. 7, 2017

(86) PCT No.: PCT/EP2017/063795
§ 371 (c)(1),
(2) Date: Dec. 12, 2018

(87) PCT Pub. No.: WO2018/001688
PCT Pub. Date: Jan. 4, 2018

(65) Prior Publication Data
US 2019/0309796 A1    Oct. 10, 2019

(30) Foreign Application Priority Data

Jun. 27, 2016 (DE) .................. 10 2016 111 757

(51) Int. Cl.
*F16C 17/10* (2006.01)
*F16C 23/10* (2006.01)
(Continued)

(52) U.S. Cl.
CPC ............ *F16C 23/10* (2013.01); *F16C 33/046* (2013.01); *F16C 33/08* (2013.01); *F16C 33/208* (2013.01);
(Continued)

(58) Field of Classification Search
CPC .......... F16C 17/02; F16C 17/10; F16C 33/04; F16C 33/08; F16C 33/20; F16C 33/201
See application file for complete search history.

(56) References Cited

U.S. PATENT DOCUMENTS 1,384,178 A * 7/1921 Casgrain ................ A43D 87/00
                                                               12/47
3,319,484 A * 5/1967 Prest ..................... F16D 1/0835
                                                              74/531

(Continued)

FOREIGN PATENT DOCUMENTS

DE       19508418 A1    9/1996
DE       19725227 A1    1/1998
(Continued)

OTHER PUBLICATIONS

International Search Report and Written Opinion Form PCT/ISA/220 and PCT/ISA/237, pp. 1-8, International Filing Date Jun. 7, 2017, search report dated Sep. 8, 2017.

(Continued)

*Primary Examiner* — Phillip A Johnson
(74) *Attorney, Agent, or Firm* — Bond Schoeneck & King, PLLC; George McGuire

(57) ABSTRACT

The invention relates to a rolled plain bearing bush, having a butt joint, an axial direction, a radial direction, and a peripheral direction, comprising a first semicylindrical segment and a second semicylindrical segment, which are arranged diametrically opposite each other, and a third segment and a fourth segment, which each deviate from the semicylindrical shape of the first and second segments and are arranged between the first and second segments in the peripheral direction and diametrically opposite each other, wherein the first and second segments each have a semicylindrical inner peripheral surface and outer peripheral surface, and wherein the third and fourth segments each have (Continued)

a flat inner peripheral surface, which flat inner peripheral surfaces extend parallel to each other, wherein a smallest radial distance between the inner peripheral surfaces of the third and fourth segments is less than a bush inside diameter, which corresponds to a radial distance between the inner peripheral surfaces of the first and second segments, which is constant along the extent of the inner peripheral surfaces of the first and second segments.

9 Claims, 3 Drawing Sheets

(51) Int. Cl.
  *F16C 33/04* (2006.01)
  *F16C 33/08* (2006.01)
  *F16C 33/20* (2006.01)
  *F16C 33/10* (2006.01)
  *F16C 17/02* (2006.01)

(52) U.S. Cl.
  CPC ............ *F16C 17/02* (2013.01); *F16C 17/107* (2013.01); *F16C 33/1095* (2013.01); *F16C 2220/44* (2013.01)

(56) References Cited

U.S. PATENT DOCUMENTS

| | | | | |
|---|---|---|---|---|
| 3,704,048 A | * | 11/1972 | Yoshikawa | F16C 17/02 384/192 |
| 3,929,392 A | | 12/1975 | Ogino | |
| 3,980,352 A | * | 9/1976 | Carlson | F16C 17/10 384/302 |
| 6,755,571 B2 | * | 6/2004 | Kajiyama | B60N 2/0705 384/276 |

FOREIGN PATENT DOCUMENTS

| | | | | |
|---|---|---|---|---|
| DE | 10107109 A1 | | 10/2002 | |
| WO | WO-9416107 A1 | * | 7/1994 | ........ C12Q 1/6869 |
| WO | 20050066474 A1 | | 7/2005 | |

OTHER PUBLICATIONS

German Examination Report of Priority Application 10 2016 111 757.9, filed on Jun. 27, 2016. Examination Report effective date of Jun. 29, 2016 and created on Mar. 13, 2017.

* cited by examiner

PLAIN BEARING BUSH

CROSS-REFERENCES TO RELATED APPLICATIONS

This application is the U.S. National Phase Entry of PCT Application No. PCT/EP2017/063795 filed on Jun. 7, 2017, which claims priority to German patent application No. DE102016111757.9, filed on Jun. 27, 2016, the entire disclosure of each of which is incorporated herein by reference.

BACKGROUND OF THE INVENTION

The present invention relates to a plain bearing bush for receiving a shaft or a lever, the received shaft or the received lever in the plain bearing bush being radially movable in a plane that extends in the radial direction. Plain bearing bushes are known from the prior art which are produced by an externally and internally cylindrical plain bearing bush being worked on the inside thereof such that the cross section of the inner opening thereof is oval.

DE 101 07 109 A1 discloses a collar bush having a shaped collar without a butt joint.

A crank slide frame is known from DE 197 25 227 A1. WO 2005/066 474 A1 describes a piston arrangement.

One problem with plain bearing bushes of this kind is that production is complex and therefore cost-intensive. The object of the present invention is to produce a plain bearing bush that can receive a shaft or a lever by providing radial movability in a plane extending in the radial direction and can be produced easily and cost-effectively.

SUMMARY OF THE INVENTION

This object is achieved according to the invention by a rolled plain bearing bush, having a butt joint, an axial direction, a radial direction, and a peripheral direction, comprising a first semicylindrical segment and a second semicylindrical segment, which are arranged diametrically opposite each other, one of the cylindrical segments comprising the butt joint, and a third segment and a fourth segment, which each deviate from the semicylindrical shape of the first and second segments and are arranged between the first and second segments in the peripheral direction and diametrically opposite each other, the first and second segments each having a semicylindrical inner peripheral surface and outer peripheral surface, and the third and fourth segments each having a plane in the peripheral surfaces which extend parallel to each other, a smallest radial distance between the inner peripheral surfaces of the third and fourth segments being less than a bush inside diameter, which corresponds to a radial distance between the inner peripheral surfaces of the first and second segments, which is constant along the extent of the inner peripheral surfaces of the first and second segments. The inner peripheral surfaces of the third and fourth segments rest against a received shaft or a received lever. As the radial distance of the inner peripheral surfaces of the first and second segments from each other, i.e. the bush inside diameter, is constant and larger than the smallest radial distance between the inner peripheral surface of the third and fourth segments, the received shaft has backlash and can be displaced or tilted towards the first or second segment, i.e. in a plane that extends parallel to the third and fourth segments. The plain bearing bush according to the invention can be produced in a simple manner, as it can be produced in a single rolling process, the plain bearing bush being rolled such that the butt joint is arranged in the first segment or in the second segment. The inner peripheral surface of the first segment and the inner peripheral surface of the second segment are therefore on a lateral surface of a straight inner circular cylinder having a bush inside diameter. The inner circular cylinder having a bush inside diameter corresponds to the extent of the inner peripheral surfaces, if the plain bearing bush as a whole were to have the shape of a straight circular cylinder. As a result of this design, the plain bearing bush according to the invention can be produced in a simple manner.

It is also advantageous in this case if the outer peripheral surface of the first segment and the outer peripheral surface of the second segment are on a lateral surface of a straight outer circular cylinder having a receiving diameter. As a result, the plain bearing bush according to the invention can be inserted into a bearing receptacle in a simple manner, it being possible to produce the bearing receptacle in a simple manner by means of a straight circular cylindrical hole having the diameter of the receiving diameter. This makes it possible to use the plain bearing bushes according to the invention in conventional receiving bearings.

It is also advantageous if the third and fourth segments each comprise a flat outer peripheral surface which extend parallel to each other. As a result, the plain bearing bush according to the invention can be rolled from a linear starting material, without said starting material needing to have various material thicknesses.

It is also advantageous if the third and fourth segment each have a peripheral extent at an angle of extent between 20° and 80°. Wherein the angle of extent is measured at the center point of the plain bearing bush in the peripheral direction and corresponds to the angular dimension of the extent of the third and fourth segments, wherein the peripheral extent of the entire plain bearing bush therefore corresponding to an angle of extent of 360°. This embodiment produces an advantageous relationship between the extent of the first and second segments and the third and fourth segments, such that when the received shaft is supported adequately, sufficient backlash of the shaft is provided. It is also advantageous if a wall thickness of the plain bearing bush in the region of the third segment and the fourth segment, and preferably in the region of the first segment and the second segment, is larger by at least 0.4 mm than the square root of one sixty-fourth of the difference between the square of the bush inner diameter and the square of the smallest radial distance of the inner peripheral surface of the third and fourth segments. This ensures that the third segment and the fourth segment are designed so as to be sturdy enough to form a bearing point for the received shaft without the bush deforming.

It is also advantageous if radial movability in a plane extending in the radial direction, which movability corresponds to the difference between the bush inner diameter and the smallest radial distance of the inner peripheral surface of the third and fourth segments, is at least 1 mm. This provides sufficient backlash for a received shaft, while simultaneously ensuring reliable support via the third and fourth segments.

It is also advantageous if the plain bearing bush according to the invention comprises a metal/plastics composite material, wherein a three-dimensional porous carrier layer may be provided into which the plastics component, which is preferably fluoropolymer, can be inserted and retained. The plastics component may also be a fluorine-free plastics material, however. In this case, the metal/plastics composite material advantageously comprises a protective layer made of steel and a three-dimensional porous carrier layer made of bronze sintered thereon, the plastics component, preferably PTFE (perfluoro tetraethylene) or another fluoropolymer, being inserted into and retained in the cavities of the sintered three-dimensional porous bronze carrier layer. This results in advantageous properties of the plain bearing bush with regard to stability, tribological properties as well as wear resistance and production costs.

Preferably, the plain bearing bush according to the invention comprises a radially extending collar. This allows the plain bearing bush to provide radial and axial support.

Advantageously, the butt joint is arranged in the first segment or in the second segment. As a result, the plain bearing bush is more stable and can support a shaft or a lever more securely.

The subject matter of the present invention is also a bearing point for supporting an outer cylindrical shaft, comprising a circular housing opening for a rolled plain bearing bush that can be pressed therein, a rolled plain bearing bush according to one or more of the preceding embodiments, which is pressed into the housing opening, and an outer cylindrical shaft having a shaft outside diameter WA, the housing opening being cylindrical and there being a gap between the respective flat outer peripheral surfaces of the third and fourth segments and the cylindrical inner peripheral surface of the housing opening and the smallest radial distance of the inner peripheral surfaces of the third and fourth segments from each other corresponding to the shaft outside diameter WA of the shaft, such that the shaft can be displaced and/or tilted in a plane that is parallel to the respective flat inner peripheral surfaces of the third and fourth segments. The bearing point described here can advantageously be produced cost-effectively due to the use of the rolled plain bearing bush according to one or more of the variants described here or according to one or more of claims 1 to 9, secure and reliable support of the outer cylindrical shaft in the bearing point being ensured.

BRIEF DESCRIPTION OF THE DRAWING FIGURES

Further features, possible uses and advantageous of the invention can be found in the following description of embodiments of the invention, which are explained with reference to the drawings, it being possible that the features are essential to the invention both in isolation and in various combinations, without explicit reference being made thereto. In the drawings.

DETAILED DESCRIPTION

Figure 1:
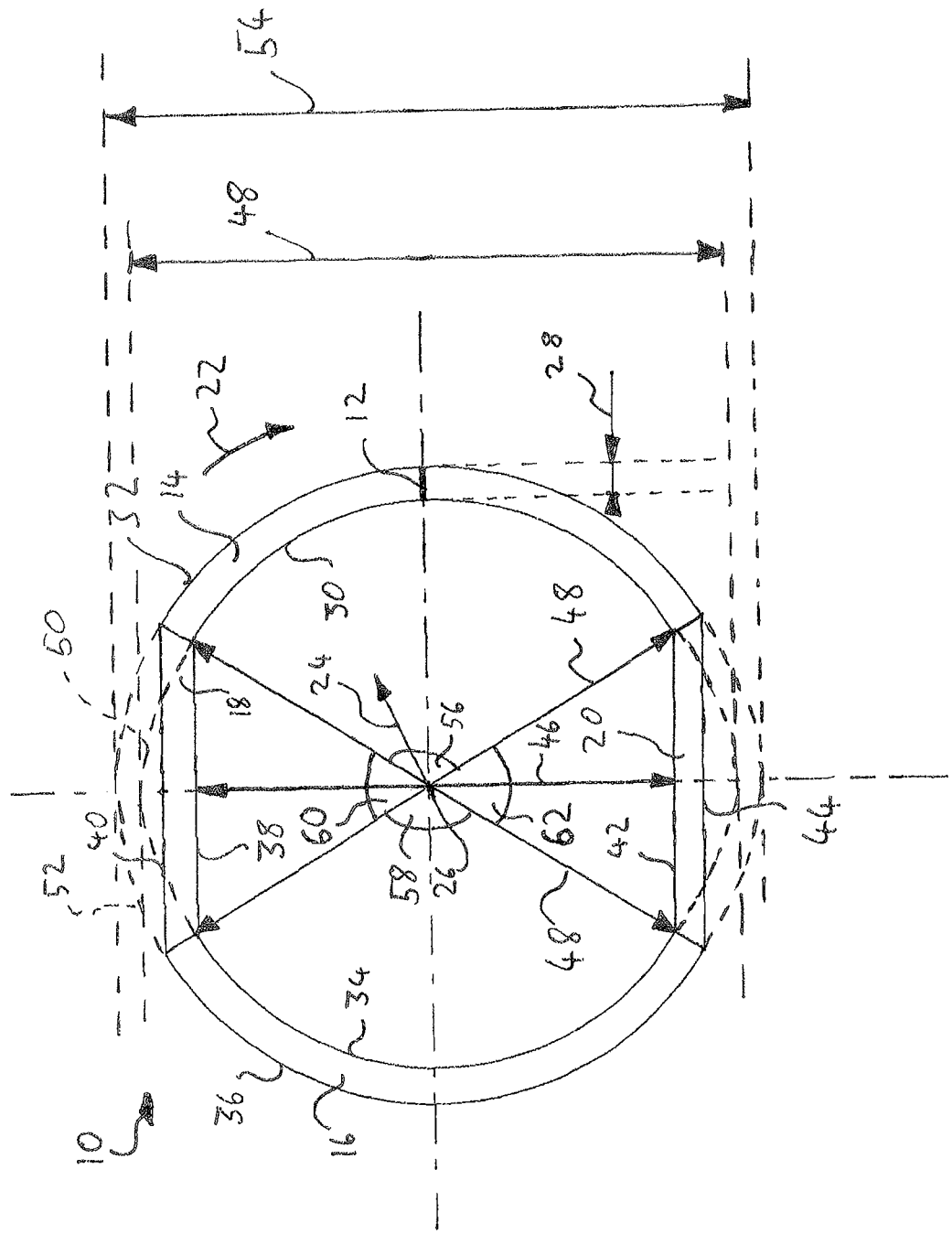
FIG. 1 is a section through a rolled plain bearing bush according to the invention.

In FIG. 1, a plain bearing bush overall has the reference numeral 10. A butt joint 12 is arranged in a first semicylindrical segment 14, which is arranged diametrically opposite a second semicylindrical segment 16. A third segment 18 and a fourth segment 20 each deviate from the semicylindrical shape of the first segment 14 and second segment 16 and are arranged between the first second 14 and the second segment 16 in a peripheral direction 22. A radial direction 24 extends orthogonally to an axial direction 26, which projects from the image plane of FIG. 1. A wall thickness 28 corresponds to the material thickness of the individual segments 14, 16, 18, 20 in the radial direction 24.

The first segment 14 has an inner peripheral surface 30 and an outer peripheral surface 32. Correspondingly, the second segment 16 has an inner peripheral surface 34 and an outer peripheral surface 36 and the third segment 18 has an inner peripheral surface 38 and an outer peripheral surface 40. Correspondingly, the fourth segment 20 has an inner peripheral surface 42 and an outer peripheral surface 44. The inner peripheral surface 38 and 42 of the third segment 18 and the fourth segment 20 extend parallel, exactly like the outer peripheral surfaces 40 and 44 of said segments 18, 20.

A smallest radial distance between the inner peripheral surfaces 38, 42 of the third segment 18 and fourth segment has the reference numeral 46. A bush inside diameter of the plain bearing bush 10 has the reference numeral 48 and corresponds to the diameter of an inner circular cylinder 50, on the lateral surface of which the inner peripheral surfaces 30 and 34 of the first segment 14 and second segment 16 rest. Correspondingly, the outer peripheral surfaces 32 and 36 of the first segment 14 and second segment 16 are on the lateral surface of an outer circular cylinder 52, which has a receiving diameter 54.

The first segment 14 has an angle of extent 56. Correspondingly, the second segment 16, the third segment 18 and the fourth segment 20 each have angles of extent 58, 60, 62. The angles of extent 56, 58, 60, 62 each indicate the angular dimension of the extent of the individual segments 14, 16, 18 and 20 in the peripheral direction 22. The sum of all the angles of extent of the four segments is 360°. The angles of extent 60 and 62 of the third and fourth segments are identical in the present case and are 62°. Correspondingly, the angles of extent 56 and 58 of the first segment 14 and of the second segment 16, respectively, are identical and are each 118°.

The wall thickness 28 of the plain bearing bush is identical along all four segments 14, 16, 18, 20 and is larger by at least 0.4 mm than the square root of one sixty-fourth of the difference between the square of the bush inside diameter 48 and the square of the smallest radial distance 46 of the inner peripheral surface 38 and 42 of the third 18 and the fourth segments 20.

The plain bearing bush 10 shown in FIG. 1 consists of a metal/plastics composite material, a three-dimensional porous carrier layer being provided into which the plastics component, which is a fluoropolymer, can be inserted and retained. In this case, the metal/plastics composite material comprises a protective layer made of steel and a three-dimensional porous carrier layer made of bronze sintered thereon, PTFE (perfluoro tetraethylene) being inserted into and retained in the cavities of the sintered three-dimensional porous bronze carrier layer.

Figure 2:
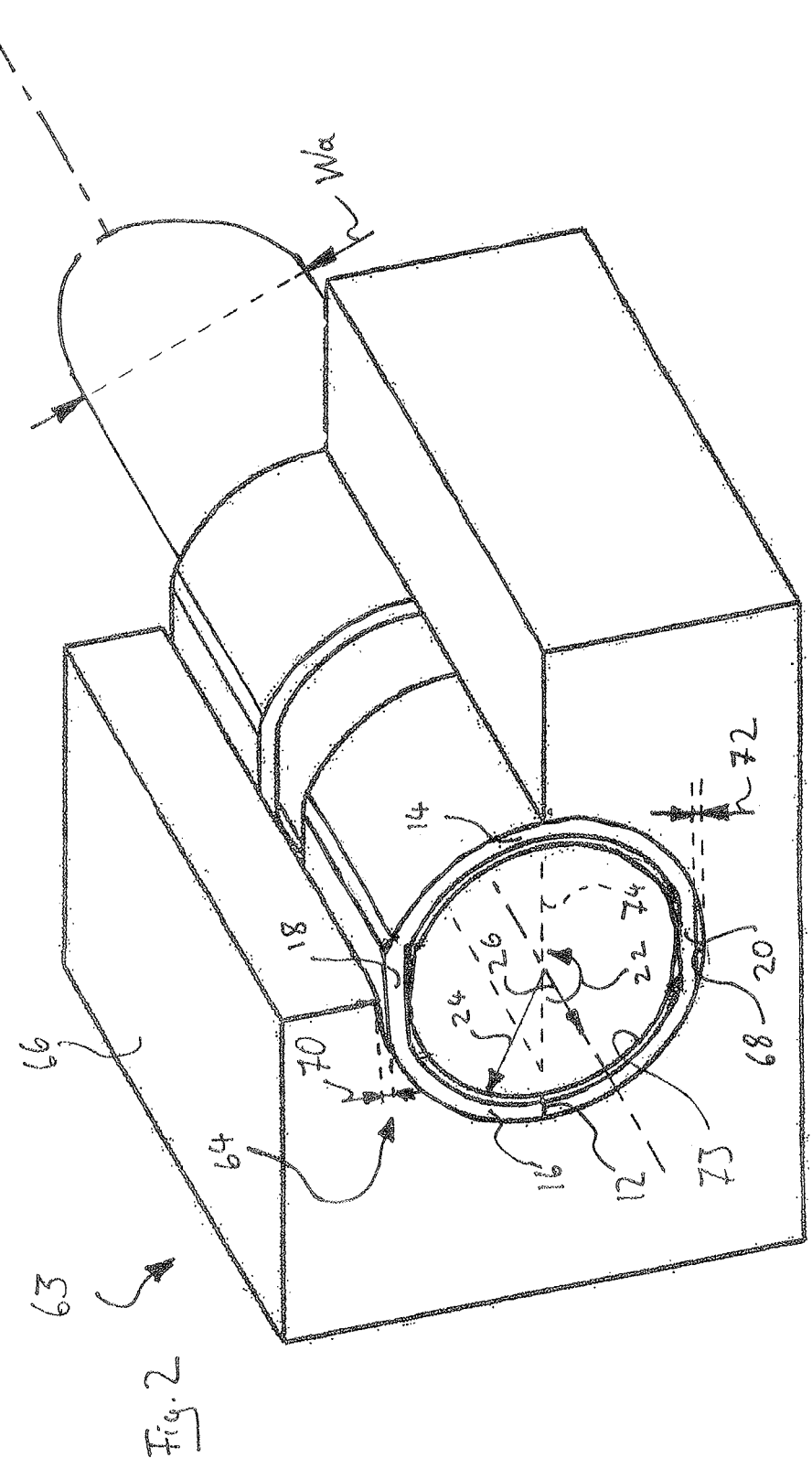
FIG. 2 is a partially cut perspective view of a bearing point according to the invention.

FIG. 2 shows a bearing point 63, the plain bearing bush 10 from FIG. 1 being received in a housing opening 64. In this case, a housing 66 that comprises the housing opening 64 is shown only in part or in a broken-out section.

A cylindrical inner peripheral surface 68 of the housing opening 64 is at a distance from the outer peripheral surfaces 40, 44 of the third segment 18 and of the fourth segment 20 in each case, this distance having the reference sign 70 with regard to the third segment 18 and having the reference sign 72 with regard to the fourth segment 20 in FIG. 2. A shaft 73 having a shaft diameter Wa, which corresponds to the smallest radial distance 46 between the inner peripheral surfaces 38 and 42 of the third segment 18 and the fourth segment 20, respectively, when said shaft is inserted into the bearing point 63, obtains a backlash due to the inner peripheral surfaces 38 and 42, arranged so as to be straight with respect to each other and extending parallel to each other, of the third segment 18 and the fourth segment 20, respectively, i.e. can be displaced and/or titled in a plane 74 that extends parallel to the inner peripheral surface 38 and 42 of the third segment 18 and fourth segment 20, respectively.

Figure 3:
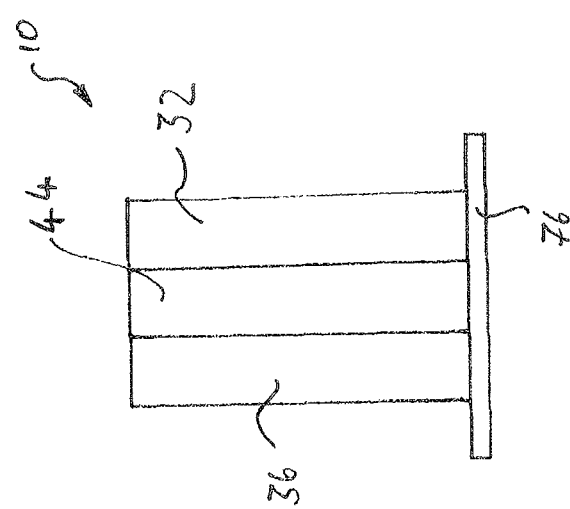
FIG. 3 is a side view of an alternative embodiment having a radially protruding collar.

FIG. 3 shows an alternative embodiment of the plain bearing bush 10, which differs from the plain bearing bush 10 shown in FIG. 1 by a radially protruding collar 76.

What is claimed is:

1. Rolled plain bearing bush, having a butt joint, an axial direction, a radial direction, and a peripheral direction, comprising a first semicylindrical segment and a second semicylindrical segment, which are arranged diametrically opposite each other, and a third segment and a fourth segment, which each deviate from the semicylindrical shape of the first and second segments and are arranged between the first and second segments in the peripheral direction and diametrically opposite each other, wherein the first and second segments each have a semicylindrical inner peripheral surface and outer peripheral surface, and wherein the third and fourth segments each have a flat inner peripheral surface, wherein the flat inner peripheral surfaces of the third and fourth segments extend parallel to each other, wherein a smallest radial distance between the inner peripheral surfaces of the third and fourth segments is less than a bush inside diameter, which corresponds to a radial distance between the inner peripheral surfaces of the first and second segments, which is constant along the extent of the inner peripheral surfaces of the first and second segments.

2. Plain bearing bush according to claim 1, characterized in that the outer peripheral surface of the first segment and the outer peripheral surface of the second segment are on a lateral surface of a straight outer circular cylinder having a receiving diameter.

3. Plain bearing bush according to claim 1, characterized in that the third and fourth segments each comprise a flat outer peripheral surface which extend parallel to each other.

4. Plain bearing bush according to claim 1, characterized in that the third and fourth segments each have a peripheral extent at an angle of extent between 20° and 80°.

5. Plain bearing bush according to claim 1, characterized in that a wall thickness of the plain bearing bush in the region of the third segment and the fourth segment, and preferably in the region of the first segment and the second segment, is larger by at least 0.4 mm than the square root of one sixty-fourth of the difference between the square of the bush inside diameter and the square of the smallest radial distance of the inner peripheral surface of the third and fourth segments.

6. Plain bearing bush according to claim 1, characterized in that radial movability in a plane extending in the radial direction, which movability corresponds to the difference between the bush inside diameter and the smallest radial distance of the inner peripheral surface of the third and fourth segments, is at least 1 mm.

7. Plain bearing bush according to claim 1, characterized in that the plain bearing bush comprises a radially extending collar.

8. Plain bearing bush according to claim 1, characterized in that the butt joint is arranged in the first segment or in the second segment.

9. Bearing point for supporting an outer cylindrical shaft or a rod, comprising a housing opening for a rolled plain bearing bush comprising a first semicylindrical segment and a second semicylindrical segment, which are arranged diametrically opposite each other, and a third segment and a fourth segment, which each deviate from the semicylindrical shape of the first and second segments and are arranged between the first and second segments in the peripheral direction and diametrically opposite each other, wherein the first and second segments each have a semicylindrical inner peripheral surface and outer peripheral surface, and wherein the third and fourth segments each have a flat inner peripheral surface, and the rolled plain bearing bush can be pressed into said opening, the rolled plain bearing bush, which is pressed into the housing opening, and an outer cylindrical shaft or rod having a shaft outside diameter Wa, wherein the interior of the housing opening is cylindrical and there is a gap between the respective flat outer peripheral surfaces of the third and fourth segments and the cylindrical inner peripheral surface of the housing opening, and wherein the smallest radial distance between the inner peripheral surface of the third and fourth segments from each other corresponds to the outside diameter Wa of the shaft, such that the shaft or rod can be displaced and/or tilted in a plane that is parallel to the respective flat inner peripheral surfaces of the third and fourth segments.

* * * * *